United States Patent
Heinicke

[15] 3,690,464
[45] Sept. 12, 1972

[54] OIL RECOVERY VESSEL FOR THE REMOVAL OF OIL AND OTHER POLLUTING MATTER FLOATING ON THE WATER SURFACE

[72] Inventor: Karl Heinicke, An der Berner Au 1, 2000 Hamburg, 72, Germany

[22] Filed: June 15, 1970

[21] Appl. No.: 45,970

[52] U.S. Cl. .......................... 210/242, 210/DIG. 21
[51] Int. Cl. ............................................. C02b 9/02
[58] Field of Search ....... 210/DIG. 21, 242, 156, 523; 415/122, 72, 60

[56] References Cited

UNITED STATES PATENTS

| | | | |
|---|---|---|---|
| 2,876,903 | 3/1959 | Lee | 210/DIG. 21 |
| 2,153,055 | 4/1939 | Weissmann | 415/122 |
| 3,539,048 | 11/1970 | Pearson | 210/242 |
| 3,219,190 | 11/1965 | Thune | 210/DIG. 21 |
| 1,591,024 | 7/1926 | Dodge | 210/DIG. 21 |
| 1,875,790 | 9/1932 | Willis | 210/156 |
| 1,326,730 | 12/1919 | Helguera | 415/122 |

Primary Examiner—Reuben Friedman
Assistant Examiner—T. A. Granger
Attorney—Young & Thompson

[57] ABSTRACT

A novel oil recovery vessel for removing oil and other floating impurities from the water surface, is provided with means for collecting such impurities, means for conveying said collected liquid impurities through the vessel and means for the discharge of redundant water from the vessel the conveying means keeping the emulsification of the removed impurities to a minimum despite a rather high operational throughput.

2 Claims, 8 Drawing Figures

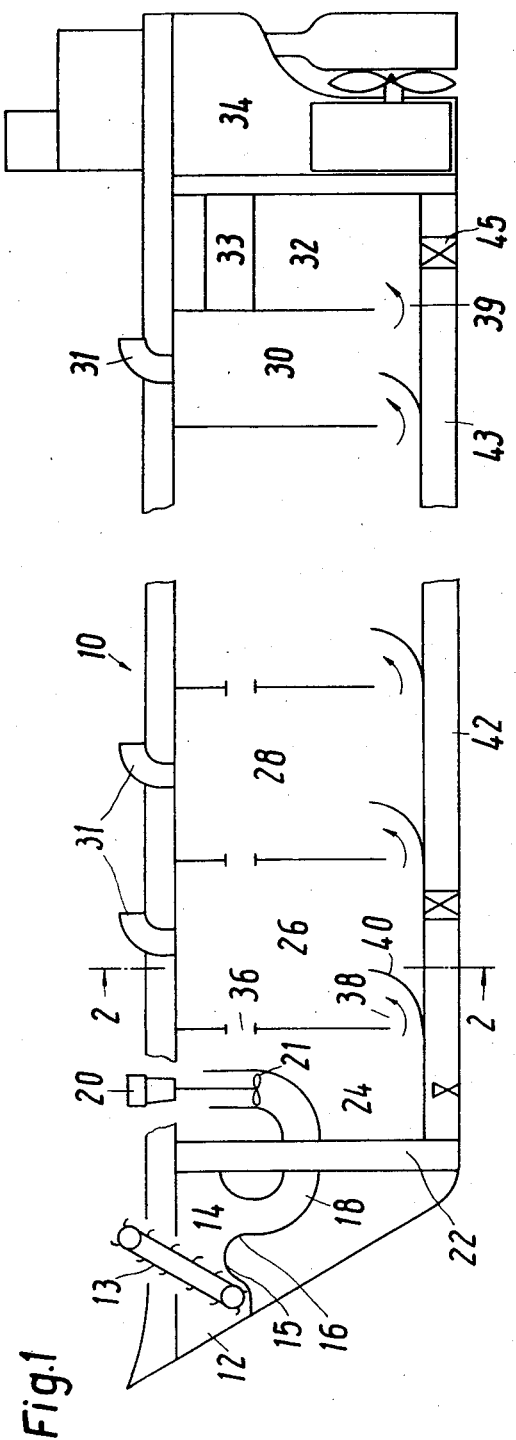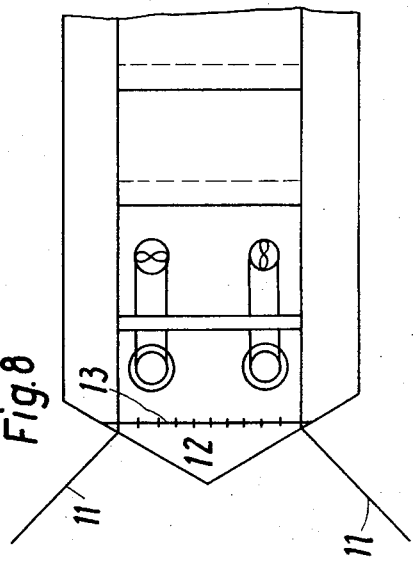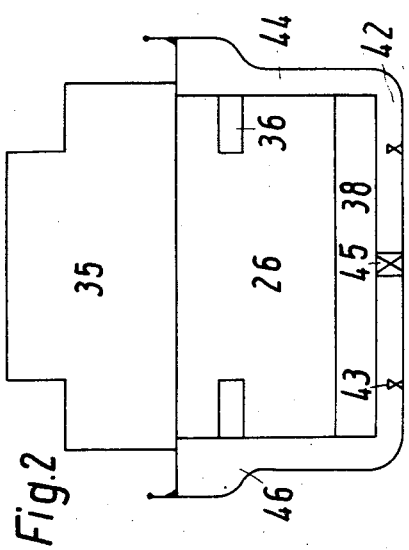

Inventor:
KARL HEINICKE
By Young & Thompson
ATTYS

OIL RECOVERY VESSEL FOR THE REMOVAL OF OIL AND OTHER POLLUTING MATTER FLOATING ON THE WATER SURFACE

BACKGROUND OF THE INVENTION

The increasing consumption of oil, fat, petrol and synthetic detergents causes a growing pollution of rivers, lakes and port areas by liquids which tend to collect at the water surface. Because of collision of tank vessels in the vicinity of coastal waters large oil quantities will spread on the water surface, thus causing pollution of extensive coastal areas by oil leakage.

The means and equipment hitherto known are not suitable to effectively prevent such accidental oil spreading. The attempt to sink the oil thus spilled by using appropriate chemicals has shown little results only in practice since the efficiency is limited and the oil and the chemicals used are lost. This widely known procedure may only be employed on deep-sea routes and not in port areas or inland waterways.

It is further known that the liquid impurities floating on the surface, particularly oil, may be skimmed off and recovered in suitable collecting tanks. The efficiency of such methods is negligible since first only a small area is covered and on the other hand a considerable quantity of water is also collected. Therefore, such collecting tanks are often arranged with additional pumping equipment, to discharge the water accumulating on the bottom.

It is also known to remove leaves, dust and similar matter floating on the water surface of a swimming pool by means of a vessel which floats on the surface and collects surface water through a float-controlled inlet. An outlet is fitted at the bottom of the vessel to which a hose is connected the outlet of which may be controlled by a valve, and through which the water is discharged from the bottom of the vessel.

Another known device for collecting oil or similar liquids which are lighter than water, consists mainly of an open trough carried on floats, to the bottom of which a hose is connected, through which the contents of the trough may be pumped out, so that water and further impurities may again enter the trough. Another known device is said to operate by using rotating, endless and liquid-absorbing belts arranged at the forebody of a working vessel. These belts are pulled through the water and squeezed dry on board of the working vessel. The polluted liquid is then collected in the working vessel which is provided with a valve-controlled outlet in the bottom part at the stern.

The appliances presently known to collect liquid impurities floating on the water surface are not accepted in practice on a wide scale. All such equipment operates with low efficiency only so that their employment would be unremunerative. Trials in connection with the removal of impurities floating on the water surface, particularly oil, as far as they are known up to the present date, are mainly limited to neutralizing the oil by using chemicals. Such methods, however, do not lead to the removal of polluted liquids, e.g., the oil floating on the water surface. All that is achieved is to sink the oil in any spot, e.g., on the sea bottom. In coastal waters it has to be taken into account that such deposits may again emerge to the surface, e.g., caused by ground swells, and which will subsequently infest the shore.

Mechanical devices operate extremely slow as a relativly small area is covered due to the design of such equipment. It is therefore one of the main objects of the invention to provide an equipment which is capable to clean water surfaces faster and more efficiently if compared with the conventional type of equipment hitherto known.

SUMMARY OF THE INVENTION

This invention refers to an oil recovery vessel, also capable of collecting other foreign matter floating on the water surface, and which is provided with means for collecting polluted liquid at the forebody which collecting means cooperates with means for conveying liquids, and means for the discharge of redundant water at the stern of the vessel.

An oil recovery vessel according to the invention is especially characterized in that the forebody of said vessel is provided with an opening immediately beneath the water surface, which forms the opening of a funnel with a vertical axis and to which a conduit is connected, in which a suction propeller is mounted the propeller being connected to a drive unit and the propeller blades being substantially confined to the area adjacent to the wall of the conduit, which terminates in a separation compartment, followed by further separation compartments featuring "through" openings in the upper and lower portion of the compartments, the last of which is provided with an outlet on the same level as the inlet. The propeller blades are preferably bent at their forward edges, starting from the part near the axle. According to another characteristic of the invention the propeller is designed in the form of a collar with blades projecting inwards, said collar constituting retating portion of the trunk.

The equipment referred to operates extremely fast and efficiently, and appropriate trials carried out in this connection have confirmed this. The means of conveyance provided according to the invention, due to the special design of same, operates so that polluting material, particularly oil which is spread like a skin on the water surface will keep a substantial degree of coherence despite passing through said conveyor means.

Consequently emulsification is kept to a minimum when employing this equipment, thus simplifying the process of separation.

The opening in the forebody with the funnel connected to same, may be so arranged and shaped that the amount of water entering with the oil in calm seas is kept to a minimum, the water serving mainly to ease the flow of the oil into the funnel.

Further advantages and characteristics of the invention are depicted in the claims and the following detailed description, explaining preferred designs by the way of example only.

BRIEF DESCRIPTION OF THE DRAWINGS

In the drawings

FIG. 1 is a simplified longitudinal section through an oil recovery vessel according to the invention;

FIG. 2 is a section along the line 2—2 of FIG. 1;

FIG. 8 is a plan view of the forebody of an oil recovery vessel as per FIG. 1, shown in a simplified manner.

An oil recovery vessel 10, according to the invention, see FIGS. 1, 2 and 8, is provided with a wide inlet at the forebody 12. The draught of the oil recovery vessel 10 is adjustable, as will be explained later, in order to position the lower boundary of the opening 12, in particular the upper edge 15 of a funnel 16, immediately beneath the water level. On both sides of the opening 12 there are arranged retractable guide poles 11 at the bow of the vessel 10. Further a conveyor equipment 13 is arranged in way of the opening 12, which comprises mainly rotating, endless chains, with netting rigged between, which carries forked teeth pointing in outward direction. This conveyor equipment is intended to reject solid objects entering into the opening 12 and to prevent same also entering into the opening 14 of the funnel 16, and to dispose of these solid objects on deck of the vessel 10.

Figure 3:
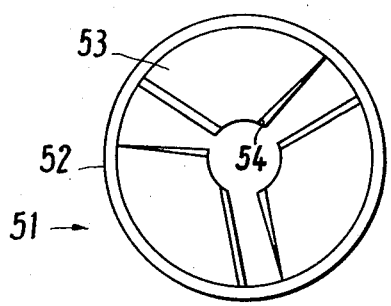
FIG. 3 is a plan view of a part of the means of conveyance, shown in a simplified manner.

From the funnel 16 a U-shaped channel 18 leads through a collision bulkhead 22 and terminates, with its legs being open at the topside, in a first separation compartment 24. In that leg of the channel 18 a propeller 21 is arranged, operated by a motor 20. The propeller will be of such shape that its conveying effect is mainly concentrated to the area adjacent or near the channel walls 18, as will be explained later.

The compartment 24 is followed by further separation compartments 26, 28, . . . , 30. Same are connected with each other by "through" openings 36 and/or 38, arranged in the upper and lower part of the compartment. Looking aft a baffle 40 is fitted behind each "through" opening 38 in the adjoining compartment. The last separation compartment 30 is followed by an outlet compartment 32, with an opening 39 being provided only in the bottom part leading from the compartment 30 to the compartment 32. The outlet compartment 32 is arranged with openings 33 in the upper part, same leading over board.

Aft of the outlet compartment 33 the engine room 34 will be arranged, above which a wheelhouse 35 is located. The side walls and the bottom of the oil recovery vessel 10 are designed as floats 42, 44 and 46. These floats are at least partly filled with air during the operation of the vessel. For initial adjustment of the draught of the vessel the floats may be flooded through valves 43. Pumps not shown will discharge the water to such an extent that the edge 15 is slightly submerged. Additional valves are installed to flood also the compartments 24, 26, 28, 30, 32 should this be required.

FIG. 8 shows in particular that with the arrangement of two funnels 16 with openings 14 arranged abreast in the forebody and with the guide poles 11 being extended, the oil recovery vessel will be able to operate with a comparatively large inlet area. With a suitable design of the oil recovery vessel 11 and the arrangement of a plurality of outfits 16, 18, 20, 21 placed abreast the operating capacity may be even increased.

During the operation of the proposed oil recovery vessel 10 the surface layer of the water in front of the vessel 10 will be drawn into the opening 12 and further into the opening 14 of the funnel 16 by the suction propeller, creating an eddy in the center containing the uppermost surface layer which is pulled through the channel 18. Emulsifying with the water immediately below the uppermost layer is kept to a minimum, so that the separation of impurities or oil from the water will be completed in a comparatively short period, after the liquid has left the channel 18 and entered into the compartment 24. The oil then separates in the upper part of the separation compartment 24. Since liquid is continuously entering the impurities or the oil will move through the upper "through" openings 36 into the adjacent compartments 26, 28, etc. The water settles in the lower part of the compartment 24 and will be forced by the liquid continuously entering through the lower openings 38 into the following compartments. The baffles 40 will take care that the water when entering the next compartment has an upward component which promotes the separation of residuary impurities. With the design illustrated in the Figures the last but one compartment 30 is arranged as a lock chamber which is only connected by a lower opening 38 with the preceding compartment. This compartment 30 is fitted with a bleeder valve 31 for removal of the separated oil, similar to the other compartments. In the compartment 30 residuary impurities or oil not separated in the preceding compartments may separate from the water before the water enters into the outlet compartment 32 and is discharged through the upper outlet opening 33, finally leaving the compartment.

Figure 4:
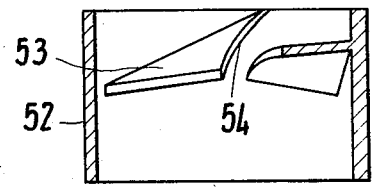
FIG. 4 is a simplified perspective view of the part shown in FIG. 3.
Figure 5:
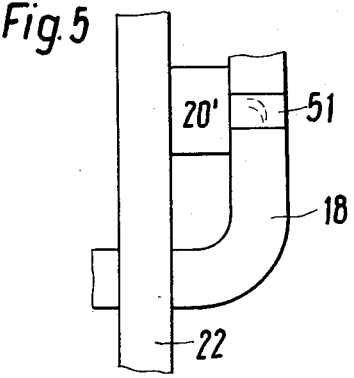
FIG. 5 is a part view of a modified embodiment of a vessel according to the invention.
Figure 6:
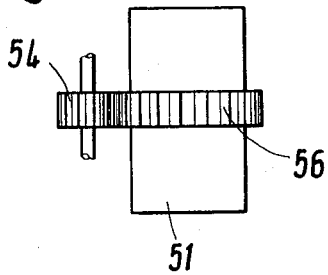
FIG. 6 is a drive unit of the embodiment according to FIG. 5.

According to FIG. 3 and 4 preferably a propeller will be used, comprising a sleeve 52, fitted with the propeller blades 53 at the inside of same. The propeller blades 53 are bent at their forward edges 54, beginning near the axis. Shape and arrangement of the propeller blades 53, which leave the center of the sleeve 52 free, will be such that the liquid is mainly carried and admitted within the border zone of the propeller blades. The sleeve 52 is arranged in the channel 18 and connected to a prime mover 20, see FIG. 5 and 6. For this purpose the channel may feature an interruption, in which the sleeve 52 is installed and sealed, but still rotating freely. A gear rim 56 fitted on the outside of the sleeve engages in a similar gear wheel 57 of the prime mover 20.

Figure 7:
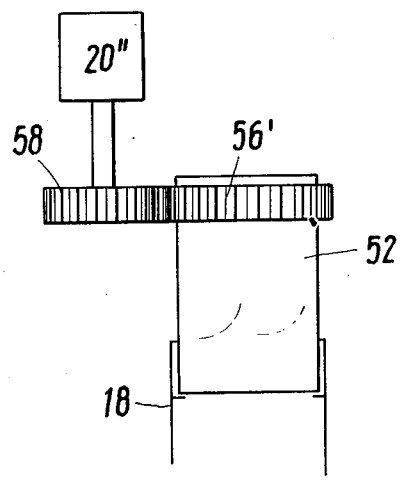
FIG. 7 is a part view of another embodiment.

An alternative arrangement is shown in FIG. 7. The illustration shows a sleeve 52 inserted in the top of the channel 18 and provided with a gear rim 56 at its upper end, engaging in a gear wheel 58 which is driven by the prime mover 20.

I claim:

1. In a vessel for skimming oil and the like from the surface of a body of water, said vessel having a bow, a stern, and sidewalls, said vessel having an intake located in said bow with an overflow edge slightly below the surface of said body of water and a funnel receiving oil and water by gravity from said overflow edge, said funnel opening downwardly into a conduit between said sidewalls, said conduit extending downwardly from said funnel and then turning and extending upwardly and discharging oil and water to a plurality of separation compartments disposed between said sidewalls one behind the other in a series lengthwise of the ship from said bow to said stern and in fluid communication with each other; the improvement comprising a pump in said conduit, said pump having an open centerless rotary impeller disposed below said surface and located in the upwardly extending portion of said conduit, said conduit discharging into the forwardmost of said series of compartments near the bow of the vessel, an outlet disposed in the rearmost of said series of compartments near the stern of the vessel below said surface of said body of water, and pump means to remove oil from the surface of the liquid in said compartments.

2. A vessel as claimed in claim 1, said impeller comprising a rotatable portion of said conduit having blades projecting inwardly therefrom.

* * * * *